US011824672B2

(12) United States Patent
Sriraman et al.

(10) Patent No.: US 11,824,672 B2
(45) Date of Patent: Nov. 21, 2023

(54) SYSTEMS AND METHODS FOR SEAMLESS AUDIOVISUAL TELECONFERENCING

(71) Applicant: Verizon Patent and Licensing Inc., Basking Ridge, NJ (US)

(72) Inventors: Venkatesan M. Sriraman, Chennai (IN); Vijay A. Senthil, Chennai (IN); Nagalakshmi Natarajan, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 17/461,059

(22) Filed: Aug. 30, 2021

(65) Prior Publication Data

US 2023/0064986 A1 Mar. 2, 2023

(51) Int. Cl.
*H04L 12/18* (2006.01)
*H04L 65/1076* (2022.01)
*H04N 7/15* (2006.01)

(52) U.S. Cl.
CPC ...... *H04L 12/1822* (2013.01); *H04L 12/1818* (2013.01); *H04L 65/1076* (2013.01); *H04N 7/15* (2013.01)

(58) Field of Classification Search
CPC ............. H04L 12/1822; H04L 12/1818; H04L 65/1076; H04N 7/15
See application file for complete search history.

(56) References Cited

U.S. PATENT DOCUMENTS

| | | | |
|---|---|---|---|
| 9,167,098 B1 * | 10/2015 | Anderson | H04M 3/567 |
| 2010/0088371 A1 * | 4/2010 | Xu | H04W 8/22 |
| | | | 709/228 |
| 2010/0189243 A1 * | 7/2010 | Miller | H04M 3/56 |
| | | | 379/202.01 |
| 2011/0268263 A1 * | 11/2011 | Jones | H04M 3/563 |
| | | | 379/202.01 |
| 2013/0177011 A1 * | 7/2013 | Carter | H04M 7/006 |
| | | | 370/352 |
| 2016/0234264 A1 * | 8/2016 | Coffman | H04L 65/4053 |
| 2016/0308919 A1 * | 10/2016 | Hori | H04L 65/403 |
| 2018/0012192 A1 * | 1/2018 | Rosenberg | H04L 65/403 |
| 2020/0084057 A1 * | 3/2020 | Wadhwa | H04M 3/563 |

OTHER PUBLICATIONS

Interop Labs, "What is SIP?", May 11, 2004, Network World, 5 pages (Year: 2004).*

* cited by examiner

*Primary Examiner* — John A Follansbee
*Assistant Examiner* — Raqiul A Choudhury

(57) ABSTRACT

User Equipment ("UEs") associated with a conference may automatically join the conference (e.g., in situations where the teleconference is a scheduled teleconference or other suitable situations). As discussed below, when automatically joining a teleconference in such a manner, the UE may refrain from sending conference-related information (e.g., captured audio, video, etc.) to a teleconferencing system or to other participants of the teleconference until a user of the UE selects to join the teleconference. In this manner, control signaling or other setup procedures may be performed prior to the user selecting to join the teleconference, thus reducing the amount of time spent to perform such signaling or procedures after the user has indicated readiness to join the teleconference.

20 Claims, 11 Drawing Sheets

SYSTEMS AND METHODS FOR SEAMLESS AUDIOVISUAL TELECONFERENCING

BACKGROUND

Organizations, enterprises, institutions, etc. are increasingly making use of teleconferencing for meetings between members. Such teleconferencing may include video calls, voice calls, audiovisual conferences, or the like.

DETAILED DESCRIPTION OF EXAMPLE EMBODIMENTS

Figure 1:
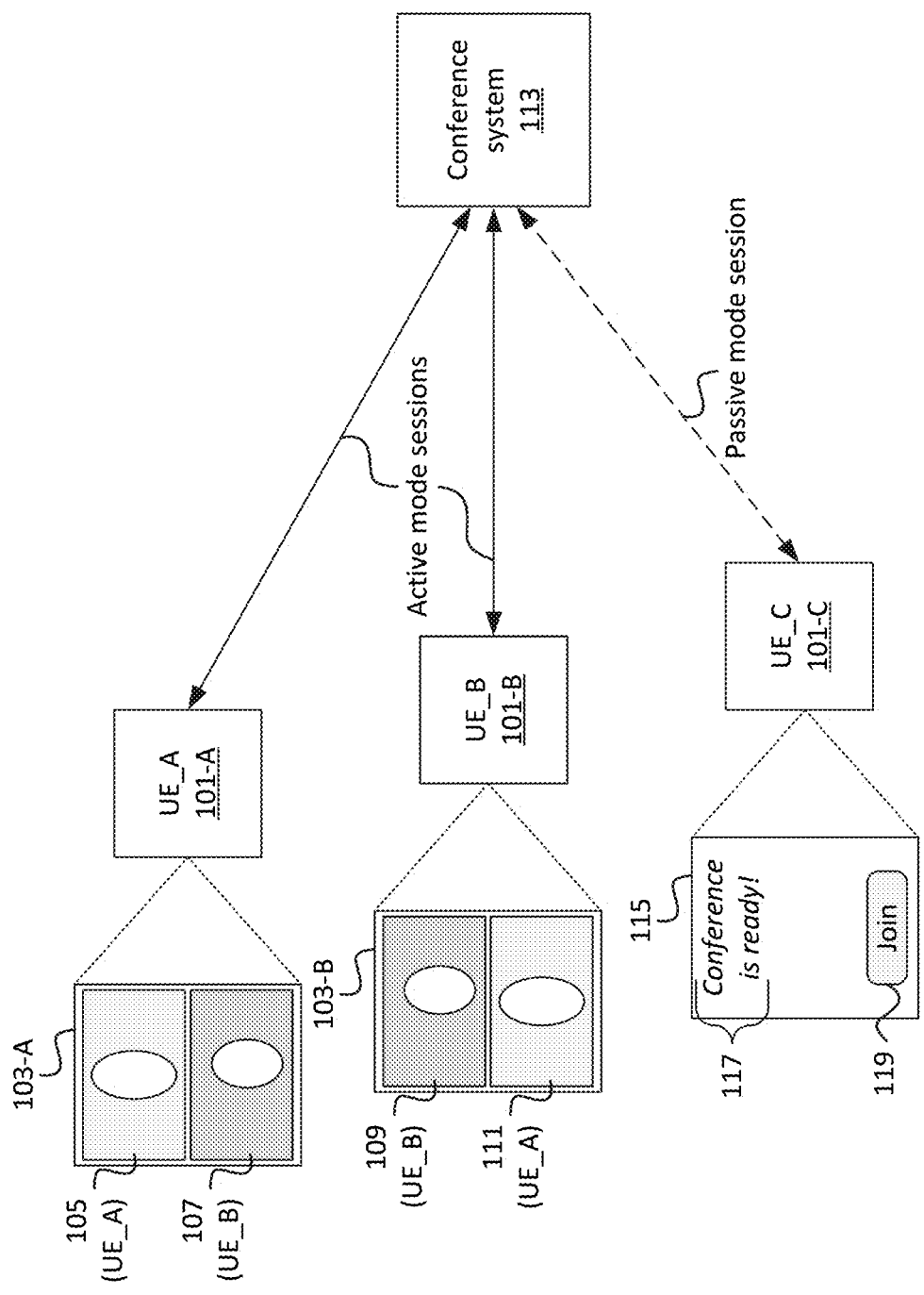
FIGS. 1 and 2 illustrate an example overview of one or more embodiments described herein.

The following detailed description refers to the accompanying drawings. The same reference numbers in different drawings may identify the same or similar elements.

Embodiments described herein provide for a teleconferencing system in which User Equipment ("UEs") of participants in a teleconference may automatically join the teleconference (e.g., in situations where the teleconference is a scheduled teleconference or other suitable situations), according to configuration parameters of their teleconference software and prior to the user being ready to join the conference. As discussed below, when automatically joining a teleconference in such a manner, the UE may refrain from sending conference-related information (e.g., captured audio, video, etc.) to a teleconferencing system or to other participants of the teleconference until a user of the UE selects to join the teleconference. In this manner, control signaling or other setup procedures may be performed prior to the user being ready and selecting to join the teleconference, thus reducing the amount of time spent to perform such signaling or procedures after the user has indicated readiness to join the teleconference. Further, since conference-related information is not sent from the UE, the privacy of the user may be preserved (e.g., audio and/or video of the user may not be sent to other teleconference participants until the user is ready).

In some embodiments, other teleconference participants may not be notified that the UE has automatically joined the teleconference, before the user of the UE has indicated that they are ready to join the teleconference, thus preserving a user experience for the user and/or other participants of the teleconference. For example, refraining from notifying the other teleconference participants that the UE has automatically joined the conference may avoid situations where the other teleconference participants become confused about the UE joining the teleconference without sending audio and/or video to other the other participants.

As used herein, the term "teleconference" (or "conference") may refer to a communication session involving multiple UEs. During the course of a given conference a UE may locally capture data using one or more input devices or sensors associated with the UE, and provide some or all of the captured data to one or more other UEs and/or to a conference system that provides services related to the conference. Such locally captured data may include captured video (e.g., captured via a camera integrated in or communicatively coupled to the UE), captured audio (e.g., captured via a microphone integrated in or communicatively coupled to the UE), sensor data (e.g., captured, measured, etc. via an accelerometer, a gyroscope, a haptic sensor, a touchscreen, etc.), and/or other types of data that may be captured by or input via the UE. Similarly, the UE may receive data captured, sensed, etc. by one or more other UEs that are involved in the conference. Such captured, sensed, etc. data may be referred to herein as "conference information." In some embodiments, conference information may be or may include user plane traffic associated with the conference, while control plane traffic may be used for operations such as establishing a communication session, joining a communication session, activating or deactivating a particular mode associated with the communication session, etc.

As shown in FIG. 1, a set of UEs 101 may be associated with a teleconference session. For example, a first UE 101-A ("UE_A") and a second UE 101-B ("UE_B") may be engaged in the conference in an "active" mode, while a third UE 101-C ("UE_C") may have automatically joined the conference in a "passive" mode (and/or may otherwise be engaged in the conference in the passive mode), in accordance with some embodiments. In the active mode, UEs 101-A and 101-B may send and/or receive conference information, which may include audio and video captured at UEs 101-A and/or 101-B and other information indicating to active participants that UEs 101-A and 101-B are also active participants on the teleconference. Accordingly, UEs 101-A and 101-B may present respective user interfaces ("UIs") 103 associated with the conference. Such UIs 103 may be presented by, for example, a conferencing application associated with UEs 101-A and 101-B.

For example, UE 101-A may present UI 103-A, while UE 101-B may present UI 103-B. As shown, UI 103-A may include display areas 105 and 107, and UI 103-B may include display areas 109 and 111. Display areas 105 and 111 may depict, for example, a user of UE 101-A, while display areas 107 and 109 may depict a user of UE 101-B. For example, display area 105 may depict locally captured video data associated with UE 101-A, and display area 109 may depict locally captured video data associated with UE 101-B. Further, display area 107 (presented by UE 101-A) may depict video data captured and/or provided by UE 101-B, while display area 111 (presented by UE 101-B) may depict video data captured and/or provided by UE 101-A.

For example, since UEs 101-A and 101-B are in an active mode, UEs 101-A and 101-B may each provide, to conference system 113, conference information captured at UEs 101-A and 101-B. UEs 101-A and 101-B may be in the active mode based on a selection of an option (e.g., by respective users of UEs 101-A and 101-B) to start, join, etc. the conference. Such option may have been while UEs 101-A and 101-B were in a passive mode.

For example, UE 101-C, as further shown in FIG. 1, may be in a passive mode session associated with the conference. In the passive mode, UE 101-C may not send conference information (e.g., captured audio, video, sensor data, etc.) to other participant UEs (i.e., UEs 101-A and 101-B, in this example). Further, in the passive mode, conference system 113 may not provide an indication to UEs 101-A and 101-B that UE 101-C has joined the conference in passive mode. Additionally, or alternatively, in the passive mode, conference system 113 may provide an indication to UEs 101-A and 101-B, and a conference application, an application programming interface ("API"), etc. of UEs 101-A and 101-B may cause UIs 103-A and 103-B to refrain from presenting an indication that UE 101-C has joined the conference (e.g., in passive mode). As such, users of UEs 101-A and 101-B may not receive an indication that UE 101-C has joined the conference. In other words, users of UEs 101-A and 101-B are not made aware in their teleconference UI or in any other manner that user of UE 101-C has joined the conference, even in passive mode. For example, such an indication may be confusing to the other users, inasmuch as these users may otherwise expect to receive conference information from UE 101-C when receiving a notification that UE 101-C has joined the conference. Further, refraining from presenting a notification to the other users may preserve the privacy of the user of UE 101-C, in situations where the user does not desire to engage in the conference at that time.

As discussed in greater detail below, UE 101-C may establish the passive mode session (e.g., with conference system 113) automatically, without a specific user selection to establish the passive mode session. For example, UE 101-C may identify a scheduled conference associated with UE 101-C and/or a user associated with UE 101-C. The conference may be identified based on, for example, a calendar entry on a calendar application associated with UE 101-C, an email with an invitation to the conference in an email application associated with UE 101-C, an invitation associated with a social media account of a user of UE 101-C, etc. The calendar entry, email, invitation, etc. may include a meeting link, conference code, metadata, scheduling information, etc. which may be identified by a conference application or other type of application, based on which a scheduled time and control information (e.g., meeting link to join the conference) may be determined. In some embodiments, a conference application may communicate with a calendar application or other type of application via one or more APIs in order automatically detect conferences (e.g., scheduled conferences), based on which UE 101-C may automatically join a conference in passive mode. For example, a user of UE 101-C may "link" or "connect" one or more applications, such that a conference application of UE 101-C(e.g., which automatically establishes communications in a passive mode) based on information received from one or more other applications, such as information indicating a scheduled conference associated with UE 101-C.

UE 101-C may accordingly communicate with conference system 113 to establish the passive mode session, which may include exchanging one or more control messages (e.g., Session Initiation Protocol ("SIP") messages or messages according to some other suitable protocol) to establish a connection, communication session, etc. between UE 101-C and conference system 113. Such control messages may associate UE 101-C with a particular conference, such as a conference in which UEs 101-A and 101-B are also participants and/or have also been invited to the conference.

Based on establishing the passive mode session, UE 101-C may present (e.g., display) UI element 115. In some embodiments, UI element 115 may be or may include a "pop-up" notification, a system-level notification, an email, and/or some other suitable type of notification. In some embodiments, UI element 115 may include UI element 117, such as text (e.g., "Conference is ready!") notifying a user of UE 101-C that a conference (e.g., a scheduled conference) is ready to be joined. UI element 115 may also include selectable option 119 (e.g., a button or other suitable type of selectable UI element). As discussed below, selection of selectable option 119 may cause UE 101-C to join the conference in the active mode. Alternatively, a user of UE 101-C may set a time-out period that applies to the passive mode. For example, the user of UE 101-C may set a time-out that once exceeded while the UE 101-C is in passive mode causes the UE 101-C to disconnect from the teleconference, or may cause the UE 101-C to automatically join the conference in active mode.

Figure 2:
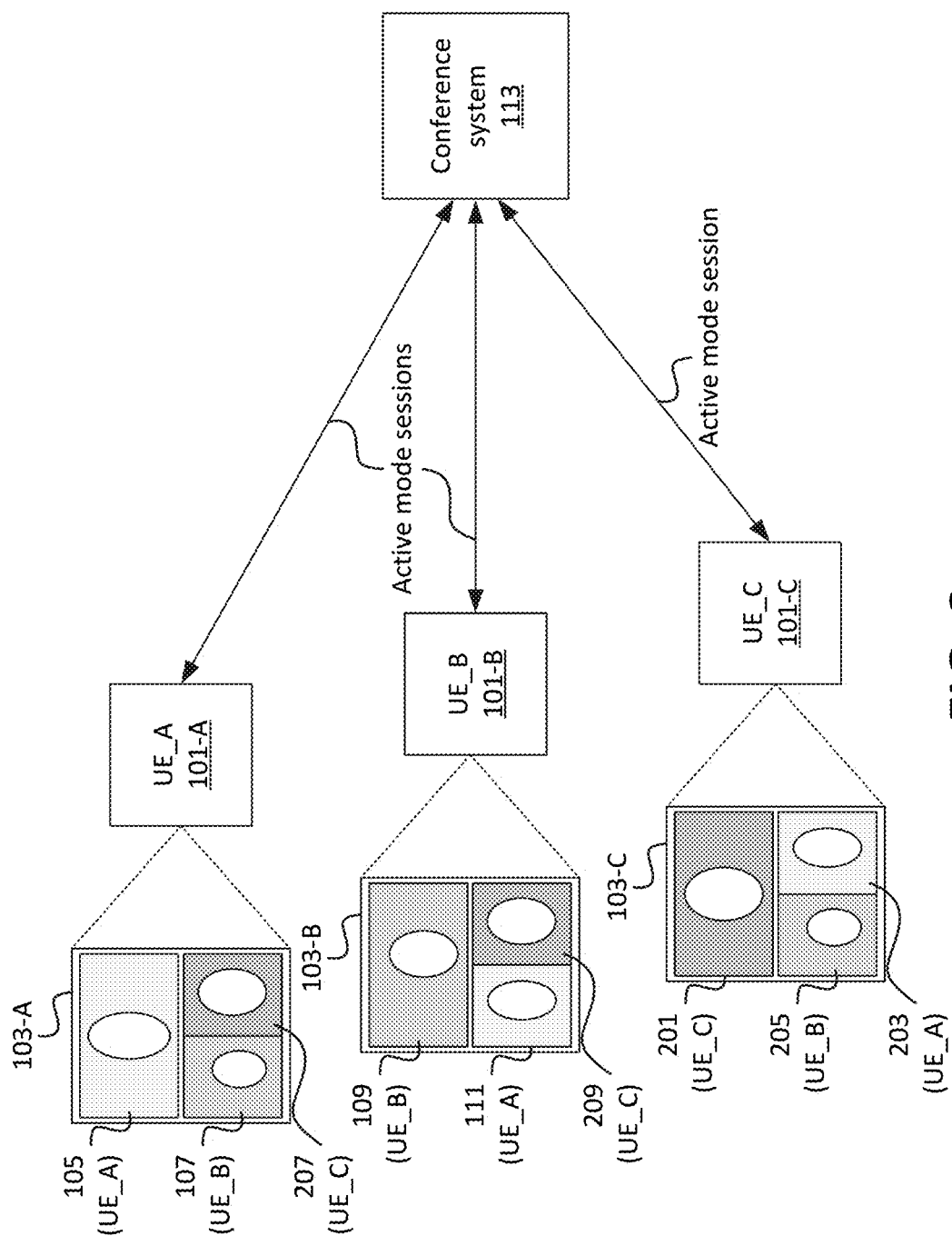

For example, as shown in FIG. 2, once selectable option 119 is selected (e.g., by a user of UE 101-C), UE 101-C may send and/or receive conference information. For instance, UE 101-C may output captured video and/or audio to UEs 101-A and 101-B (e.g., via conference system 113), and/or conference system 113 may forward captured video and/or audio from UE 101-C to UEs 101-A and 101-B. Additionally, or alternatively, conference system 113 may indicate, to UEs 101-A and 101-B, that UE 101-C has joined the conference. In some embodiments, UE 101-C may join the conference in active mode, but with audio and/or video muted; in such situations, conference system 113 may indicate, to UEs 101-A and 101-B, that UE 101-C has joined the conference without forwarding audio and/or video (e.g., as muted by a user of UE 101-C) to UEs 101-A and 101-B. In embodiments where the passive mode includes the sending of conference data from UE 101-C to conference system 113, conference system 113 may refrain from providing conference information associated with UE 101-C to UEs 101-A and/or 101-B based on the passive mode associated with UE 101-C, and may begin to forward such conference information to UEs 101-A and 101-B based on UE 101-C entering the active mode (e.g., based on the selection of selectable option 119).

Once UE 101-C has joined the conference in active mode, UE 101-C may present UI 103-C, which may include display area 201 depicting captured conference information (e.g., to be sent to conference system 113 and/or to UEs 101-A and 101-B) captured at UE 101-C. UI 103-C may also include display areas 203 and 205, depicting conference information associated with UEs 101-A and 101-B, respectively). Further, UI 103-A, associated with UE 101-A, may be modified to include display area 207, depicting conference information associated with UE 101-C, and UI 103-B may similarly be modified to include display area 209, depicting conference information associated with UE 101-C.

Figure 3:
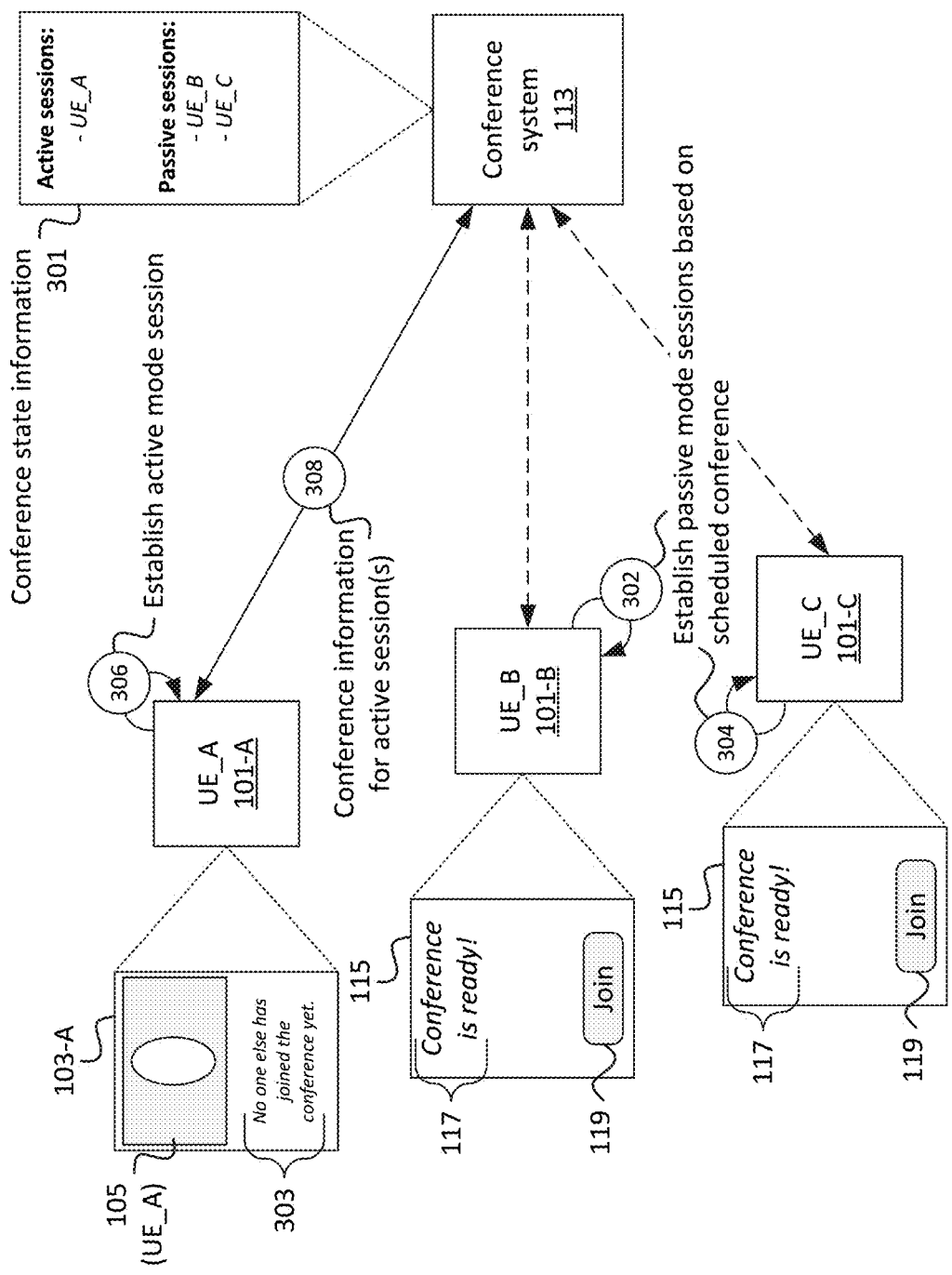
FIGS. 3-5 illustrate an example of conference participants joining a conference in an active mode and/or a passive mode, in accordance with some embodiments.

FIGS. 3-6 provide further detail on signaling that may be performed to provide the user experience shown in the example of FIGS. 1 and 2. As shown in FIG. 3, assume that UEs 101-B and 101-C establish (at 302 and 304, respectively) passive mode communication sessions based on determining that UEs 101-B and 101-C(and/or users thereof) are associated with a conference, such as a conference scheduled for a particular time. The establishing (at 302 and 304) may include UEs 101-B and 101-C sending and/or receiving SIP messages and/or other suitable messages to and/or from conference system 113. In some embodiments, UEs 101-B and 101-C may, in conjunction with or as part of establishing the passive mode communication sessions, include an indicator such as a flag, a data field, a parameter, identifier, or the like that the communication session is a passive mode communication session.

Conference system 113 may maintain conference state information 301, indicating UEs 101 that are participants in a given conference and may further indicate whether such UEs 101 are in an active mode or a passive mode with respect to the conference. For example, based on the establishing (at 302 and 304) of the passive mode communication sessions associated with UEs 101-B and 101-C, conference system 113 may maintain conference state information 301, indicating that UEs 101-B and 101-C have joined the conference and are in a passive mode. Other instances of conference state information 301 may be maintained by conference system 113 for other conferences in which one or more different UEs 101 are involved.

As further shown, UE 101-A may establish (at 306) an active mode session with conference system 113. For example, a user of UE 101-A may select a conference link, may dial into a bridge provided by conference system 113, may select an instance of selectable option 119 (e.g., UE 101-A may have previously been in a passive mode), and/or may otherwise join the conference in an active mode. Accordingly, conference state information 301 may further indicate that UE 101-A has joined the conference in an active mode. Based on such information, conference system 113 may provide (at 308) conference information for active sessions associated with the conference, as applicable. In this example, since no other UEs 101 have joined the conference in the active mode, conference system 113 may not send any audio, video, etc. to UE 101-A. In some embodiments, conference system 113 may further refrain from providing (at 308) an indication that UEs 101-B and 101-C have joined the conference, even though these UEs have joined the conference in a passive mode.

Accordingly, UI 103-A, associated with UE 101-A, may include UI element 303, indicating that that no other participants have yet joined the conference. In some embodiments, based on joining (at 306) the conference in the active mode, UE 101-A may output (at 308) conference information (e.g., captured audio, video, etc.) to conference system 113. In some embodiments, although UE 101-A has joined the conference in the active mode, UE 101-A may refrain from outputting conference information to conference system 113 based on receiving an indication that no other participants have joined the conference (and/or based on the absence of an indication that one or more other participants have joined the conference).

Figure 4:
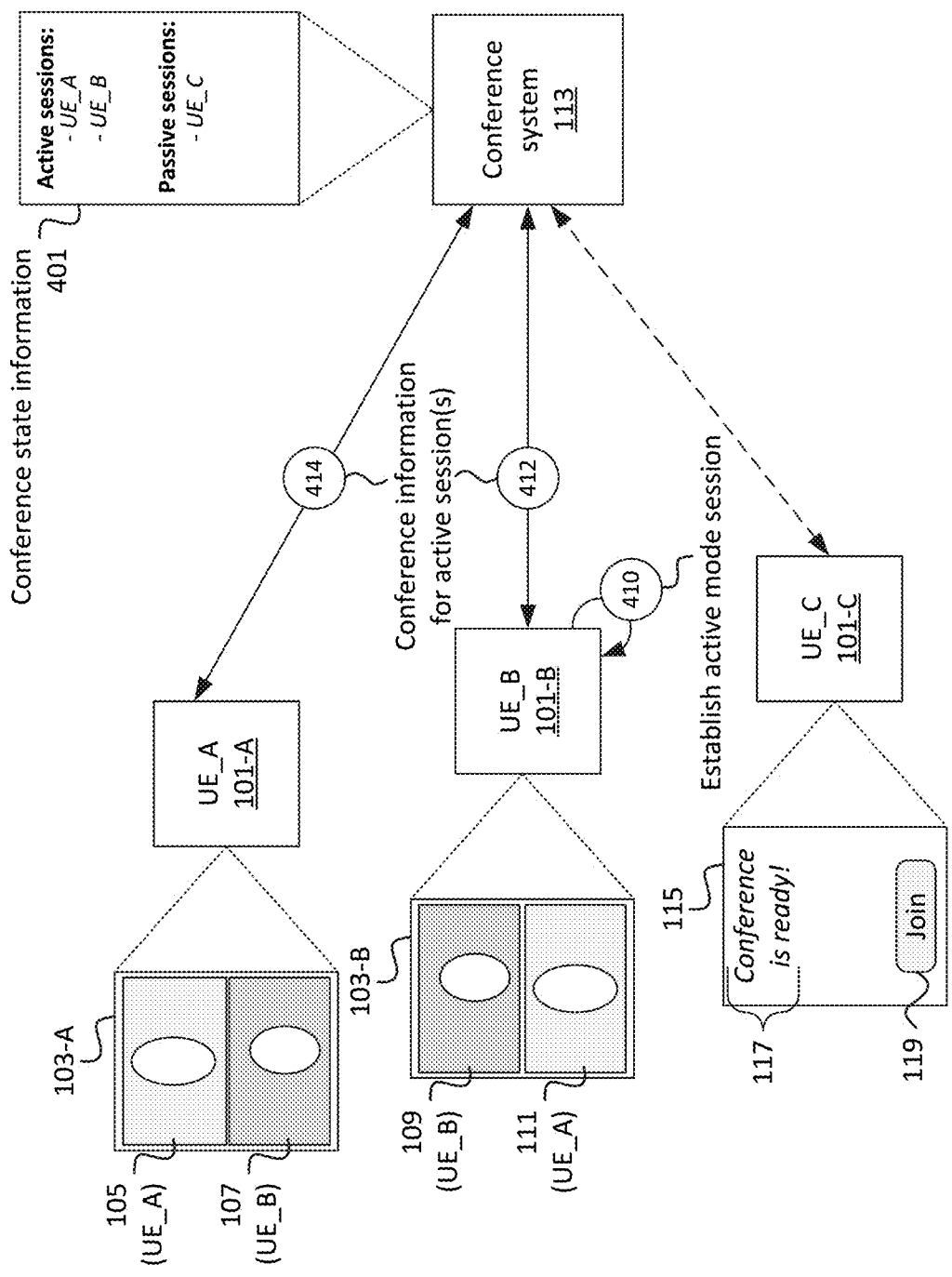

As shown in FIG. 4, UE 101-B may subsequently establish (at 410) an active mode session, associated with the conference, with conference system 113. For example, a user of UE 101-B may have selected selectable option 119 in order to join the conference in the active mode (e.g., to switch from passive mode to active mode). As part of establishing the active mode session, UE 101-B may provide a SIP message or other suitable type of message to conference system 113 (e.g., via a previously established passive mode communication session), indicating that the mode associated with UE 101-B should be switched to active mode. Conference system 113 may accordingly update conference state information 401 (e.g., by modifying conference state information 301) to reflect that UE 101-B is associated with an active mode session (e.g., no longer associated with a passive mode session).

Based on establishing (at 410) the active mode communication session, UE 101-B may proceed to output (at 412) conference information to other conference participants (e.g., by outputting such conference information to conference system 113). In some embodiments, conference system 113 may further provide (at 412) conference information associated with one or more other participants (e.g., UE 101-A) to UE 101-B, and may provide (at 414) conference information associated with UE 101-B to one or more other participants (e.g., UE 101-A) based on conference state information 401, indicating that UE 101-B is associated with the active mode.

Figure 5:
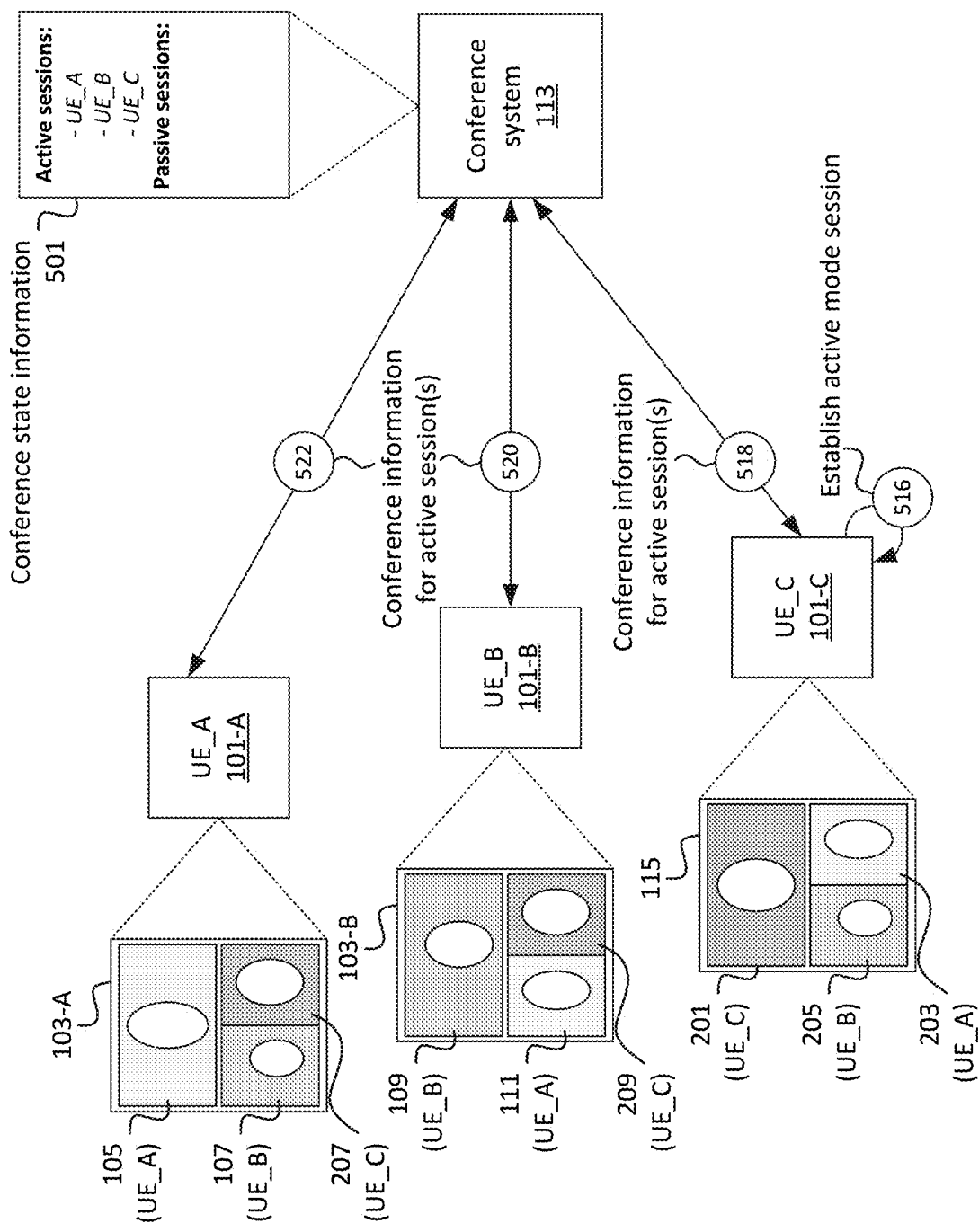

As shown in FIG. 5, UE 101-C may similarly establish (at 516) an active mode communication session (e.g., switch from passive mode to active mode), based on which conference system 113 may update conference state information 501 (e.g., by modifying conference state information 401) to reflect that UE 101-C is associated with an active mode session (e.g., no longer associated with a passive mode session).

Based on establishing (at 516) the active mode communication session, UE 101-C may proceed to output (at 518) conference information to other conference participants (e.g., by outputting such conference information to conference system 113). In some embodiments, conference system 113 may further provide (at 518) conference information associated with one or more other participants (e.g., UE 101-A and/or UE 101-B) to UE 101-C, and may provide (at 520 and 522) conference information associated with UE 101-C to one or more other participants (e.g., UEs 101-A and/or 101-B) based on conference state information 501, indicating that UE 101-C is associated with the active mode.

Figure 6:
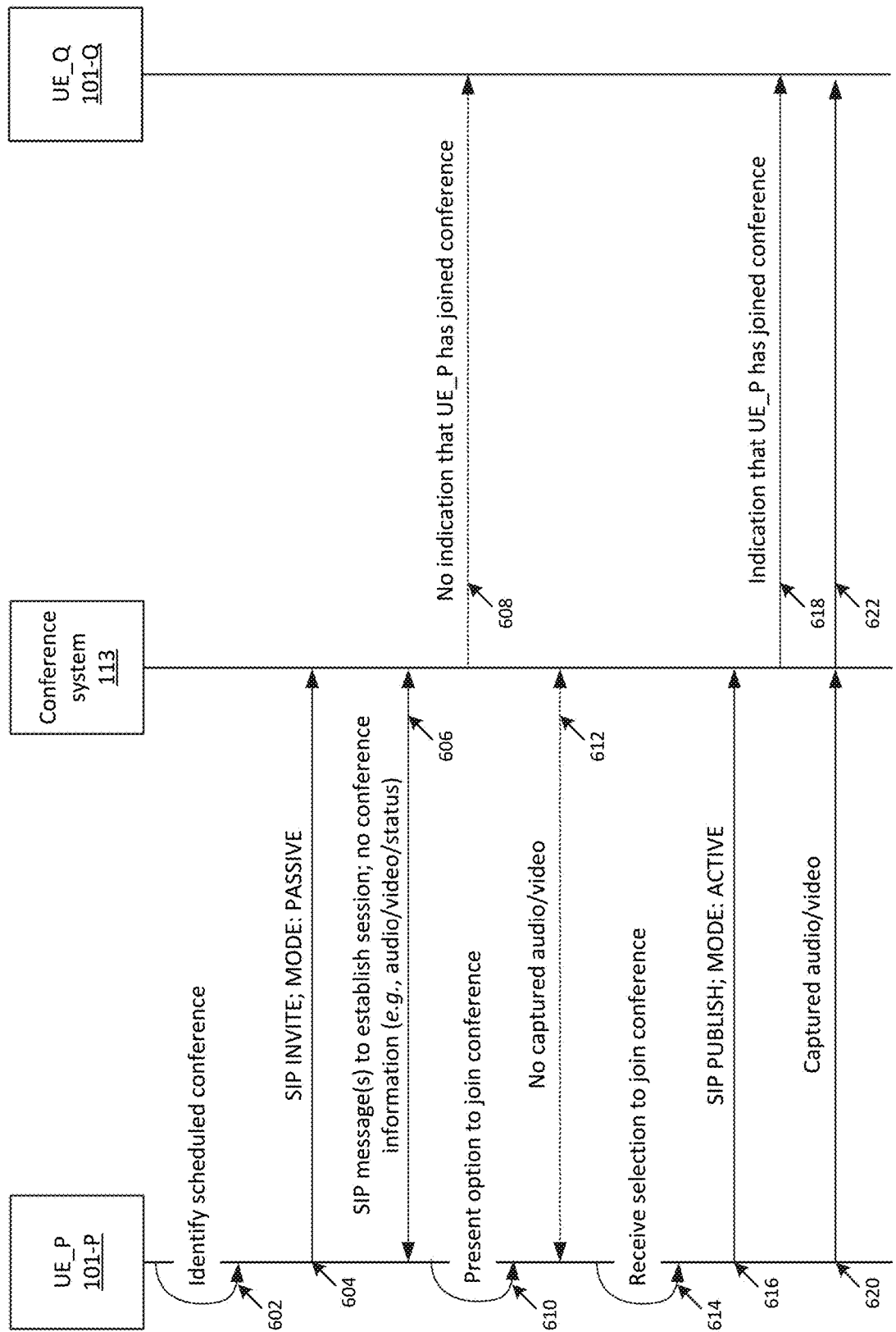
FIG. 6 illustrates an example signal flow for joining a conference in an active mode and/or a passive mode, in accordance with some embodiments.

FIG. 6 provides an example signal flow in accordance with some embodiments. This example refers to a conference in which multiple UEs 101, including UEs 101-P and 101-Q are involved. As shown, UE 101-P may identify (at 602) a scheduled conference associated with UE 101-P or a user thereof, as discussed above. Based on identifying (at 602) the scheduled conference, UE 101-P may output (at 604) a message to initiate, establish, join, etc. the conference. Such a message may include a SIP message, a Session Description Protocol ("SDP") message, or some other suitable message. In some embodiments, the message may include a "SIP INVITE" message and may include an indicator such as an attribute, a parameter (e.g., an SDP parameter), flag, etc. indicating that the UE 101-P is joining the conference in a passive mode. Additionally, or alternatively, the message may not include an indicator indicating that UE 101-P is joining the conference in active mode (e.g., where the absence of such indicator may indicate that UE 101-P is joining the conference in passive mode). As discussed above, conference system 113 may maintain information (e.g., as similarly discussed above with respect to conference state information 301, 401, and/or 501) indicating that UE 101-P is in passive mode.

UE 101-P and conference system 113 may further send and/or receive (at 606) one or more additional messages (e.g., SIP messages and/or other suitable messages), such as acknowledgments and/or other session establishment messages, in order to establish a channel, a connection, and/or some other communication pathway between UE 101-P and conference system 113. As discussed above, since UE 101-P is in a passive mode, UE 101-P may refrain from sending conference information (e.g., locally captured data) to conference system 113. Similarly, since UE 101-P is in the passive mode, conference system 113 may refrain from sending conference information (e.g., conference state information and/or captured audio or video from other UEs 101 associated with the conference). Conference system 113 may also refrain (at 608) from sending an indication, that UE 101-P has joined the conference, to UE 101-Q and/or one or more other participants in the conference.

The established communication session, in passive mode, may be a SIP communication session or other suitable communication session. For example, UE 101-P and/or conference system 113 may maintain context information (e.g., SIP context information and/or some other suitable context information), flow information, or the like to facilitate communications between UE 101-P and conference system 113. Further, UE 101-P and/or conference system 113 may perform one or more authentication procedures when establishing the communication session (e.g., in passive mode). Thus, when switching from passive mode to active mode (as described below), such procedures or the establishment of a respective context for the communication session may not need to be performed by UE 101-P and conference system 113, thus saving time and enhancing the user experience.

UE 101-P may further present an option to join the conference, such as by presenting UI element 115 and/or selectable option 119. After the option is presented, UE 101-P and conference system 113 may continue to refrain (at 112) from sending conference information to each other, until UE 101-P receives (at 614) a selection to join the conference. For example, a user of UE 101-P may have selected selectable option 119 as presented (at 610) by UE 101-P. Based on the selection to join the conference, UE 101-P may output (at 616) one or more messages, such as a SIP PUBLISH message or other suitable message to conference system 113, indicating that the mode for the passive mode communication session should be switched to active mode.

As discussed above, conference system 113 may update conference state information to indicate that UE 101-P is now associated with the conference in the active mode. Further, conference system 113 may output (at 618) a notification to UE 101-Q and/or other conference participants that UE 101-P has joined the conference. Based on receiving (at 614) the selection to join the conference, UE 101-P may further provide (at 620) captured audio and/or video (and/or other suitable conference information) to conference system 113. Further, based on the updated conference state information indicating that UE 101-P has switched from active mode to passive mode, and/or based on receiving (at 620) the captured audio and/or video, conference system 113 may forward (at 622) the audio and/or video, associated with UE 101-P, to UE 101-Q and/or other conference participants.

In some embodiments, UE 101-P may present (at 610) the option to join the conference for a particular threshold period of time. If the user of UE 101-P has not selected the option within the particular threshold period of time, UE 101-P may disconnect, disengage, etc. from the conference. For example, UE 101-P may communicate with conference system 113 to perform a "hang up" procedure, a session de-establishment procedure, and/or may otherwise leave the conference. In some embodiments, such hang up procedure, session de-establishment procedure, etc. may include outputting a SIP BYE message to conference system 113.

Figure 7:
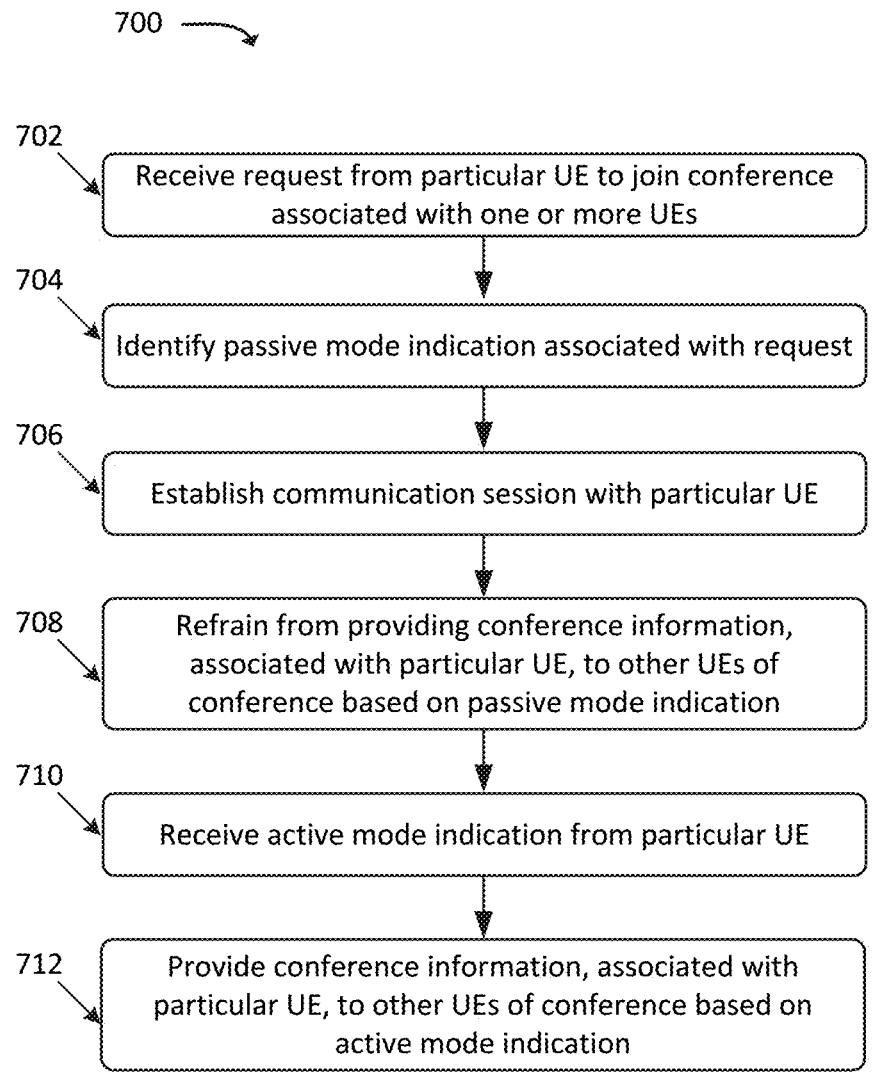
FIG. 7 illustrates an example process for establishing a passive mode communication session and seamlessly switching session to an active mode, in accordance with some embodiments.

FIG. 7 illustrates an example process 700 for establishing a passive mode communication session between a given UE 101 and one or more other UEs 101 associated with a conference, and seamlessly switching the given UE 101 to an active mode. In some embodiments, some or all of process 700 may be performed by conference system 113. In some embodiments, one or more other devices may perform some or all of process 700 (e.g., in concert with, and/or in lieu of, conference system 113).

As shown, process 700 may include receiving (at 702) a request from a particular UE 101 to join a conference associated with one or more UEs. For example, conference system 113 may receive a SIP INVITE message or some other suitable message with a request to join a conference for which conference system 113 provides conferencing services. In some embodiments, the request may include an identifier of UE 101 and/or a conference identifier, such that conference system 113 is able to authenticate UE 101 and/or identify a particular conference with which the request is associated.

Process 700 may further include identifying (at 704) a passive mode indication associated with the request. For example, the request (received at 702) may include an indicator such as an SDP parameter, a flag, or some other indicator of a passive mode. As noted above, the passive mode may denote that a user of UE 101 has not performed an action or made a selection to join the conference. For example, UE 101 may have automatically determined, or may have received a notification or instruction, that UE 101 is associated with the conference.

Process 700 may additionally include establishing (at 706) a communication session with the particular UE 101 based on the request. For example, conference system 113 may respond to the request with one or more acknowledgement messages (e.g., a SIP 200 OK message or some other suitable acknowledgement message) and/or other types of messages that may be used by conference system 113 and/or UE 101 to establish a communication session, a context, etc. between UE 101 and conference system 113. The communication session may further be associated with the particular conference.

Process 700 may also include refraining (at 708) from providing conference information, associated with the particular UE 101, to one or more other UEs 101 associated with the conference, based on the passive mode indication. For example, conference system 113 may refrain from notifying other UEs 101 associated with the conference that the particular UE 101 has joined the conference, as the particular UE 101 has joined the conference in passive mode. As noted above, in situations where the particular UE 101 provides conference information (e.g., captured audio, video, sensor data, etc.) to conference system 113 while connected in the passive mode, conference system 113 may refrain from forwarding some or all of such conference information to other UEs 101 engaged in the conference.

In some embodiments, as noted above, the particular UE 101 may refrain from providing such conference information to conference system 113 while in the passive mode. In such situations, conference system 113 may refrain from notifying other UEs 101 of the conference that the particular UE 101 is experiencing audio or video issues. For example, in an active mode or other type of communication session, conference system 113 may detect an audio or video issue based on not receiving captured audio and/or video data from the particular UE 101. In such situations, conference system 113 may notify other UEs 101 of the conference that the particular UE 101 has joined the conference, but is not sending audio and/or video data (or that a connection issue has been detected). In the passive mode, conference system 113 may refrain from detecting such audio or video issue, as the passive mode may indicate that UE 101 is intentionally not sending audio or video data to conference system 113, and the other participant UEs 101 should therefore not be notified.

Process 700 may further include receiving (at 710) an active mode indication from the particular UE 101. For example, the particular UE 101 may provide a message, such as a SIP PUBLISH message or other one or more suitable messages indicating that the mode associated with the particular UE 101, for the conference, should be set to an active mode (e.g., should be switched from passive mode to active mode). For example, such message may include an SDP parameter, a flag, or other suitable indicator of the active mode. In some embodiments, such message may include an identifier of the particular UE 101, authentication information, an identifier of the conference, etc.

Process 700 may additionally include providing (at 712) conference information, associated with the particular UE 101, to other participant UEs 101 of the conference, based on the active mode indication. For example, conference system 113 may output a notification to other UEs 101 that UE 101 has joined the conference.

In some embodiments, conference system 113 may forward audio and/or video, associated with the particular UE 101, to the other participant UEs 101 of the conference. For example, conference system 113 may start receiving such information from the particular UE 101 in conjunction with or after receiving the active mode indication. Additionally, or alternatively, conference system 113 may receive such captured audio, video, sensor data, etc. from the particular UE 101 while the particular UE 101 is in the passive mode, and may begin to forward such information to other participant UEs 101 after receiving the active mode indication. For example, in some embodiments, conference system 113 may refrain from forwarding conference information received from the particular UE 101 prior to receiving the active mode indication, and may begin to forward conference information received from the particular UE 101 after receiving the active mode indication.

Figure 8:
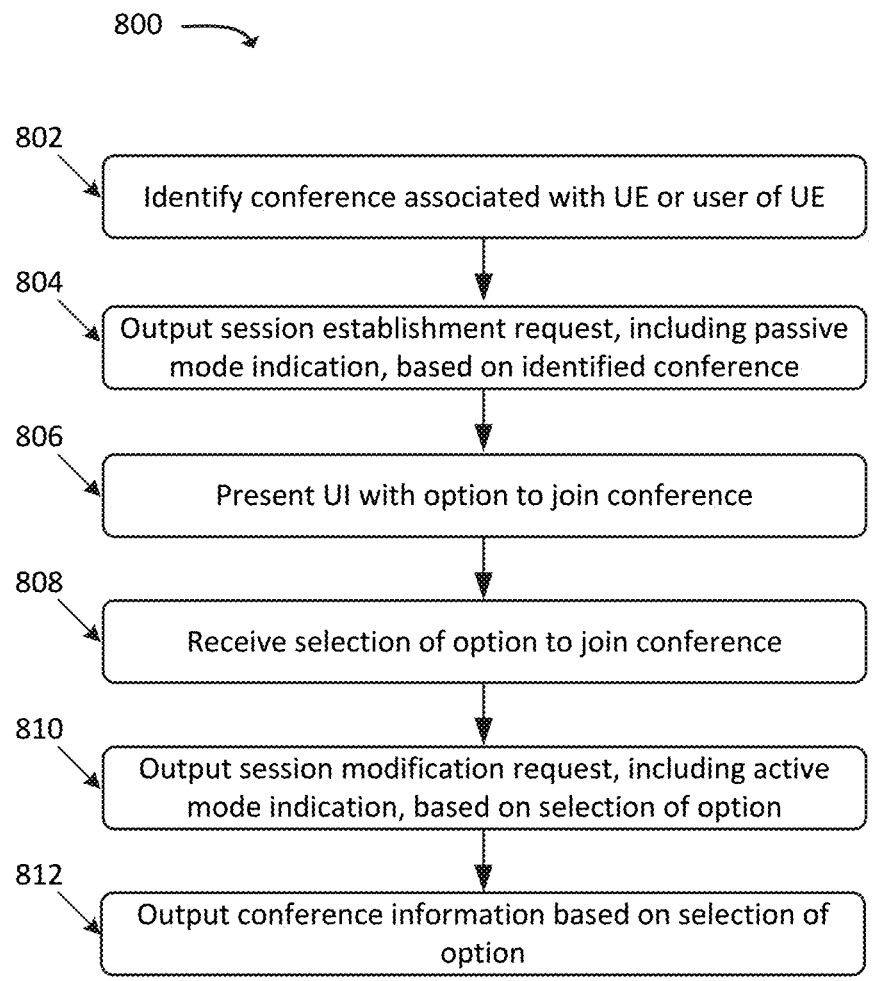
FIG. 8 illustrates an example process for automatically joining a conference in passive mode and switching from passive mode to active mode, in accordance with some embodiments.

FIG. 8 illustrates an example process 800 for automatically joining a conference in passive mode and switching from passive mode to active mode. In some embodiments, some or all of process 800 may be performed by UE 101. In some embodiments, one or more other devices may perform some or all of process 800 in concert with, and/or in lieu of, UE 101.

As shown, process 800 may include identifying (at 802) a conference associated with UE 101 and/or a user of UE 101. For example, UE 101 (e.g., an application executing at UE 101) may identify a scheduled conference associated with UE 101. For example, one or more APIs, applications, etc. associated with UE 101 may include calendars, schedules, meeting details, etc. associated with UE 101. Additionally, or alternatively, UE 101 or some other device or system may identify an event, calendar invitation, conference details, etc. associated with UE 101 or a user of UE 101 (e.g., via a social media account or other type of account). In some embodiments, UE 101 and/or some other device or system may identify such conference using artificial intelligence/machine learning ("AI/ML") techniques or other suitable automatic techniques.

Process 800 may further include outputting (at 804) a session establishment request, including a passive mode indication, based on the identified conference. For example, UE 101 may output, to conference system 113 associated with the conference, a request to establish a communication session in passive mode. As discussed above, the passive mode may include UE 101 refraining from outputting conference information (e.g., captured audio, video, sensor data, etc.) to conference system 113. In some embodiments, the passive mode may include UE 101 providing conference information to conference system 113, and conference system 113 refraining from forwarding such information to one or more other UEs 101 associated with the conference.

Process 800 may additionally include presenting (at 806) a UI with an option to join the conference. For example, UE 101 may present UI element 115 with selectable option 119, and/or some other suitable UI and/or option, to join the conference. As noted above, in some embodiments, the option to join the conference may be presented for a threshold duration of time, after which the option may be removed (e.g., UE 101 may disconnect from the conference in situations where a user of UE 101 may not desire to join the conference). Process 800 may also include receiving (at 808) a selection of the option (e.g., a selection of selectable option 119) to join the conference. For example, a user of UE 101 may select selectable option 119.

Process 800 may further include outputting (at 810) a session modification request, including an active mode indication, based on the selection of selectable option 119. For example, UE 101 may output a SIP PUBLISH message with an SDP parameter (and/or some other type of message or parameter) indicating that the communication session should be set (e.g., switched) to active mode.

Process 800 may additionally include outputting (at 812) conference information to conference system 113 based on the selection of selectable option 119. For example, UE 101 may begin to output captured audio, video, sensor data, etc. to conference system 113 once the communication session has been switched to active mode. Additionally, or alternatively, as discussed above, UE 101 may continue to provide conference information to conference system 113, and conference system 113 may begin to forward such conference information to one or more other UEs 101 of the conference. In some embodiments, once UE 101 has joined the conference in active mode, UE 101 may begin to receive or present conference information from other UEs 101 associated with the conference.

Figure 9:
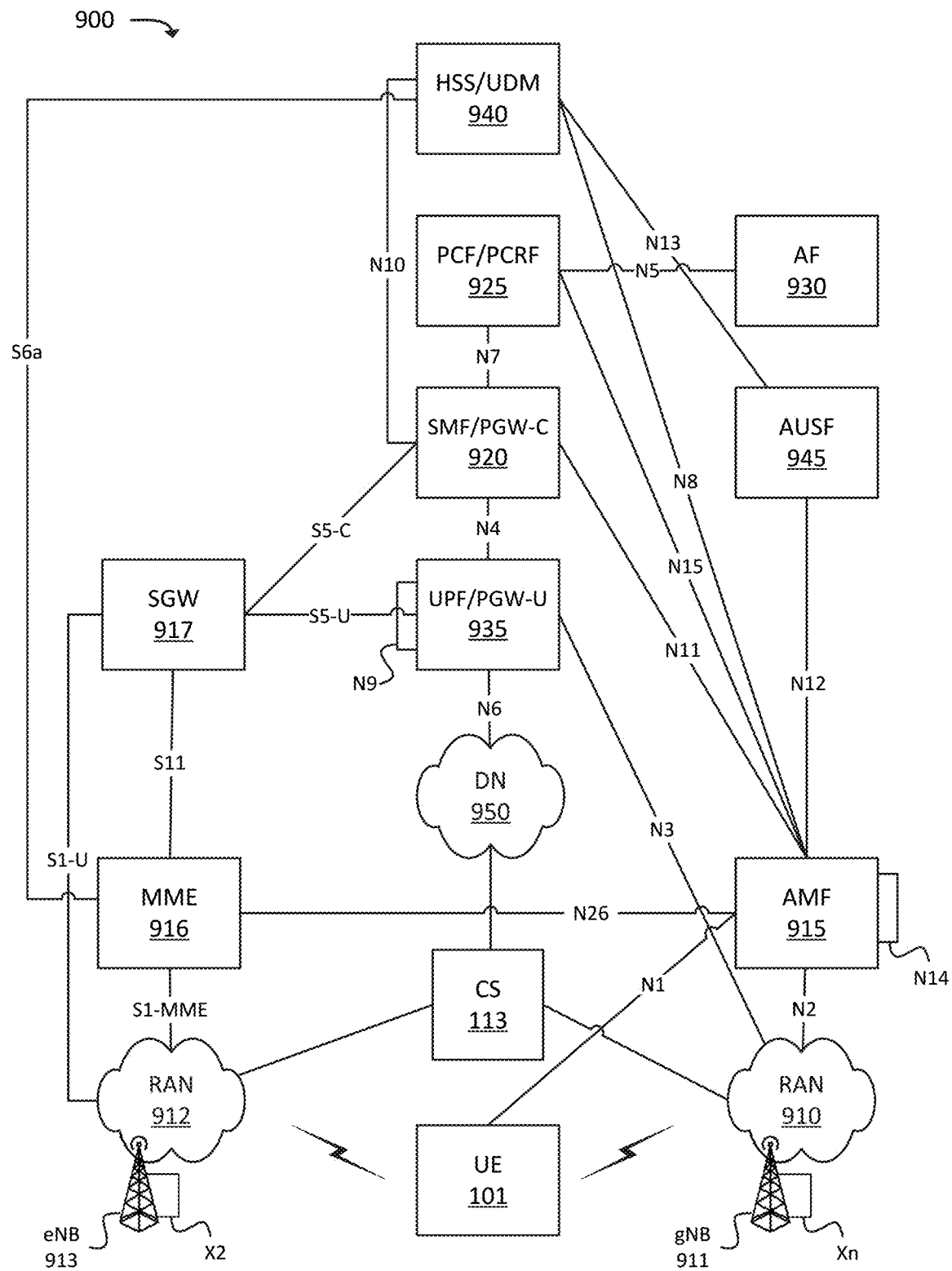
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 101, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as conference system 113, which may perform some or all of the operations described above.

The example shown in FIG. 9 illustrates one instance of each network component or function (e.g., one instance of SMF/PGW-C 920, PCF/PCRF 925, UPF/PGW-U 935, HSS/UDM 940, and/or AUSF 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or AUSF 945, while another slice may include a second instance of SMF/PGW-C 920, PCF/PCRF 925, UPF/PGW-U 935, HSS/UDM 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 101 may include a computation and communication device, such as a wireless mobile communication device that is capable of communicating with RAN 910, RAN 912, and/or DN 950. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 101 may communicate with one or more other elements of environment 900. UE 101 may communicate with RAN 910 via an air interface (e.g., as provided by gNB 911). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, AMF 915, and/or one or more other devices or networks) and may communicate the traffic to UE 101 via the air interface.

RAN 912 may be, or may include, a LTE RAN that includes one or more base stations (e.g., one or more eNBs 913), via which UE 101 may communicate with one or more other elements of environment 900. UE 101 may communicate with RAN 912 via an air interface (e.g., as provided by eNB 913). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, SGW 917, and/or one or more other devices or networks) and may communicate the traffic to UE 101 via the air interface.

AMF 915 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate the establishment of communication sessions on behalf of UE 101. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 101, from DN 950, and may forward the user plane data toward UE 101 (e.g., via RAN 910, SMF/PGW-C 920, and/or one or more other devices). In some embodiments, multiple UPFs 935 may be deployed (e.g., in different geographical locations), and the delivery of content to UE 101 may be coordinated via the N9 interface (e.g., as denoted in FIG. 9 by the line marked "N9" originating and terminating at UPF/PGW-U 935). Similarly, UPF/PGW-U 935 may receive traffic from UE 101 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 101.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 101 may communicate, through DN 950, with data servers, other UEs 101, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 101 may communicate.

Figure 10:
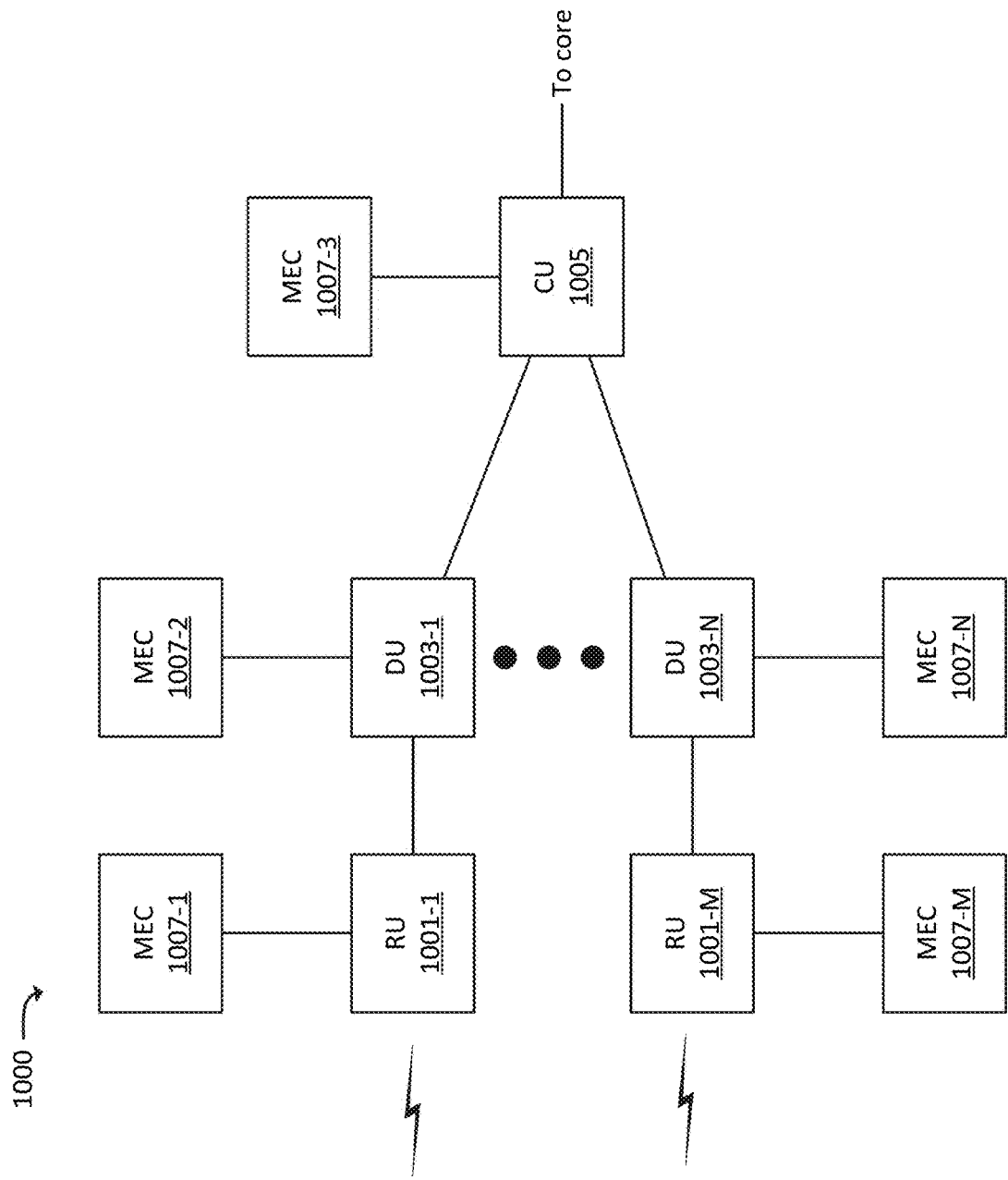
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N(referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 101 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 101, and may determine which DU(s) 1003 should receive the downlink traffic. DU 1003 may include one or more devices that transmit traffic between a core network (e.g., via CU 1005) and UE 101 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 101.

RU 1001 may include hardware circuitry (e.g., one or more RF transceivers, antennas, radios, and/or other suitable hardware) to communicate wirelessly (e.g., via an RF interface) with one or more UEs 101, one or more other DUs 1003 (e.g., via RUs 1001 associated with DUs 1003), and/or any other suitable type of device. In the uplink direction, RU 1001 may receive traffic from UE 101 and/or another DU 1003 via the RF interface and may provide the traffic to DU 1003. In the downlink direction, RU 1001 may receive traffic from DU 1003, and may provide the traffic to UE 101 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 101, via a respective RU 1001.

For example, RU 1001-1 may route some traffic, from UE 101, to MEC 1007-1 instead of to a core network (e.g., via DU 1003 and CU 1005). MEC 1007-1 may process the traffic, perform one or more computations based on the received traffic, and may provide traffic to UE 101 via RU 1001-1. In this manner, ultra-low latency services may be provided to UE 101, as traffic does not need to traverse DU 1003, CU 1005, and an intervening backhaul network between DU network 1000 and the core network. In some embodiments, MEC 1007 may include, and/or may implement, some or all of the functionality described above with respect to conference system 113.

Figure 11:
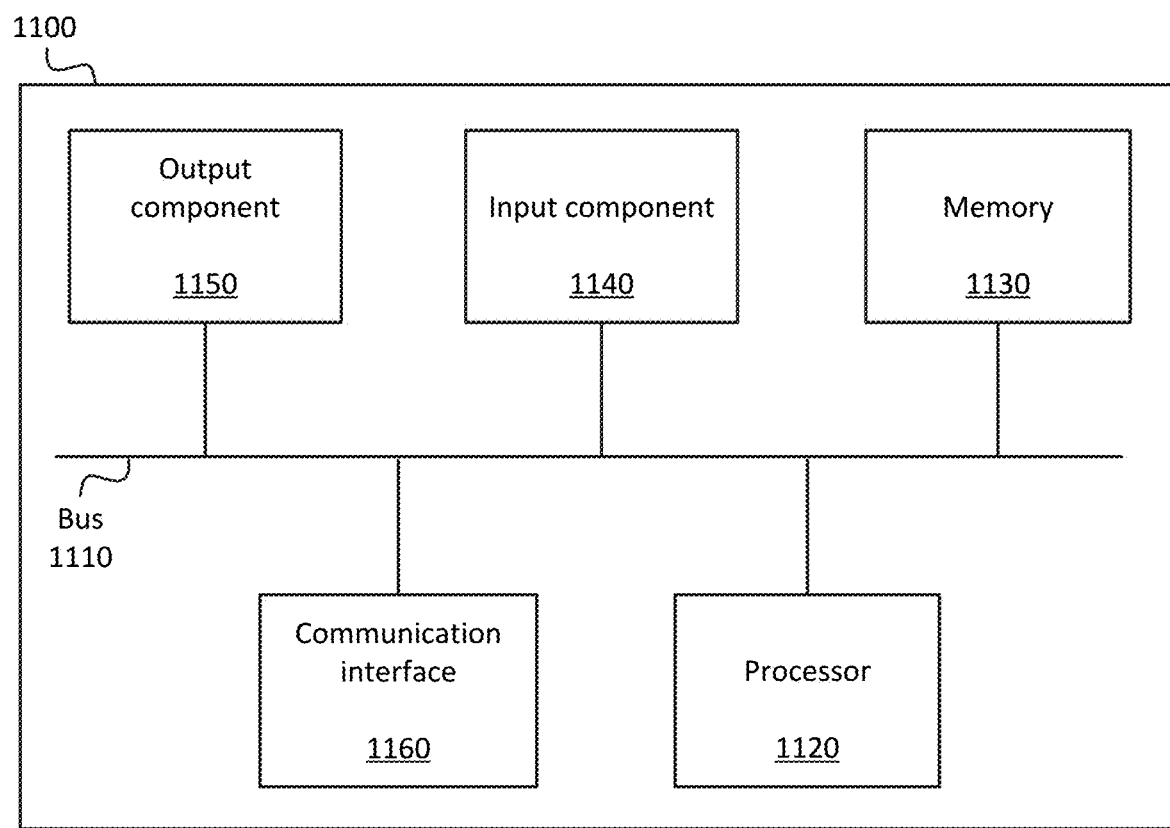
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a Session Initiation Protocol ("SIP") INVITE message from a first User Equipment ("UE"), wherein the SIP INVITE message includes:
a conference identifier associated with a conference that includes at least a second UE, and
a first Session Description Protocol ("SDP") parameter indicating a first mode of a plurality of modes;
establish a communication session with the first UE based on the SIP INVITE message;
refrain, based on the first mode indicated in the SIP INVITE message from the first UE, from notifying one or more other UEs associated with the conference, including the second UE, that the first UE has joined the conference;
receive a SIP PUBLISH message from the first UE that includes a second SDP parameter indicating a second mode of the plurality of modes; and
provide, based on the second mode indicated in the SIP PUBLISH message from the first UE, an indication to the one or more other UEs associated with the conference that the first UE has joined the conference,
wherein a user interface ("UI") associated with the second UE does not include a visual representation associated with the first UE until the SIP PUBLISH message is received from the first UE.

2. The device of claim 1, wherein establishing the communication session includes establishing a SIP context associated with the conference and the first UE.

3. The device of claim 1, wherein the first mode is a passive mode and the second mode is an active mode.

4. The device of claim 1, wherein the one or more processors are further configured to:
refrain from sending conference information, associated with the first UE, to the one or more other UEs based on the first mode indicated in the SIP INVITE message; and
send conference information, associated with the first UE, to the one or more other UEs based on the second mode indicated in the message.

5. The device of claim 4, wherein the conference information associated with the first UE includes at least one of:
audio data captured at the first UE,
video data captured at the first UE, or
sensor information captured at the first UE.

6. The device of claim 1, wherein the one or more processors are further configured to:
refrain from sending conference information, associated with the one or more other UEs, to the first UE based on the first mode indicated in the SIP INVITE message; and
send conference information, associated with the one or more other UEs, to the first UE based on the second mode indicated in the SIP PUBLISH message.

7. A non-transitory computer-readable medium, storing a plurality of processor-executable instructions to:
receive a Session Initiation Protocol ("SIP") INVITE message from a first User Equipment ("UE"), wherein the SIP INVITE message includes:
a conference identifier associated with a conference that includes at least a second UE, and
a first Session Description Protocol ("SDP") parameter indicating a first mode of a plurality of modes;
establish a communication session with the first UE based on the SIP INVITE message;
refrain, based on the first mode indicated in the SIP INVITE message from the first UE, from notifying one or more other UEs associated with the conference, including the second UE, that the first UE has joined the conference;
receive a SIP PUBLISH message from the first UE that includes a second SDP parameter indicating a second mode of the plurality of modes; and
provide, based on the second mode indicated in the SIP PUBLISH message from the first UE, an indication to the one or more other UEs associated with the conference that the first UE has joined the conference,
wherein a user interface ("UI") associated with the second UE does not include a visual representation associated with the first UE until the SIP PUBLISH message is received from the first UE.

8. The non-transitory computer-readable medium of claim 7, wherein establishing the communication session includes establishing a SIP context associated with the conference and the first UE.

9. The non-transitory computer-readable medium of claim 7, wherein the first mode is a passive mode and the second mode is an active mode.

10. The non-transitory computer-readable medium of claim 7, wherein the plurality of processor-executable instructions further include processor-executable instructions to:
refrain from sending conference information, associated with the first UE, to the one or more other UEs based on the first mode indicated in the SIP INVITE message; and
send conference information, associated with the first UE, to the one or more other UEs based on the second mode indicated in the message.

11. The non-transitory computer-readable medium of claim 10, wherein the conference information associated with the first UE includes at least one of:
audio data captured at the first UE,
video data captured at the first UE, or
sensor information captured at the first UE.

12. The non-transitory computer-readable medium of claim 7, wherein the plurality of processor-executable instructions further include processor-executable instructions to:
refrain from sending conference information, associated with the one or more other UEs, to the first UE based on the first mode indicated in the SIP INVITE message; and
send conference information, associated with the one or more other UEs, to the first UE based on the second mode indicated in the SIP PUBLISH message.

13. A method, comprising:
receiving a Session Initiation Protocol ("SIP") INVITE message from a first User Equipment ("UE"), wherein the SIP INVITE message includes:
a conference identifier associated with a conference that includes at least a second UE, and
a first Session Description Protocol ("SDP") parameter indicating a first mode of a plurality of modes;
establishing a communication session with the first UE based on the SIP INVITE message;
refraining, based on the first mode indicated in the SIP INVITE message from the first UE, from notifying one or more other UEs associated with the conference, including the second UE, that the first UE has joined the conference;

receiving a SIP PUBLISH message from the first UE that includes a second SDP parameter indicating a second mode of the plurality of modes; and providing, based on the second mode indicated in the SIP PUBLISH message from the first UE, an indication to the one or more other UEs associated with the conference that the first UE has joined the conference, wherein a user interface ("UI") associated with the second UE does not include a visual representation associated with the first UE until the SIP PUBLISH message is received from the first UE.

14. The method of claim 13, wherein establishing the communication session includes establishing a SIP context associated with the conference and the first UE.

15. The method of claim 13, wherein the first mode is a passive mode and the second mode is an active mode.

16. The method of claim 13, the method further comprising:

refraining from sending conference information, associated with the first UE, to the one or more other UEs based on the first mode indicated in the SIP INVITE message; and sending conference information, associated with the first UE, to the one or more other UEs based on the second mode indicated in the SIP PUBLISH message, wherein the conference information associated with the first UE includes at least one of:
audio data captured at the first UE,
video data captured at the first UE, or
sensor information captured at the first UE.

17. The method of claim 13, further comprising:

refraining from sending conference information, associated with the one or more other UEs, to the first UE based on the first mode indicated in the SIP INVITE message; and sending conference information, associated with the one or more other UEs, to the first UE based on the second mode indicated in the SIP PUBLISH message.

18. The method of claim 13, wherein the UI associated with the second UE presents the visual representation associated with the first UE after the SIP PUBLISH message is received from the first UE.

19. The device of claim 1, wherein the UI associated with the second UE presents the visual representation associated with the first UE after the SIP PUBLISH message is received from the first UE.

20. The non-transitory computer-readable medium of claim 7, wherein the UI associated with the second UE presents the visual representation associated with the first UE after the SIP PUBLISH message is received from the first UE.

* * * * *